April 6, 1937. H. R. LUBCKE 2,075,818
TELEVISION APPARATUS
Filed March 30, 1931 3 Sheets-Sheet 1
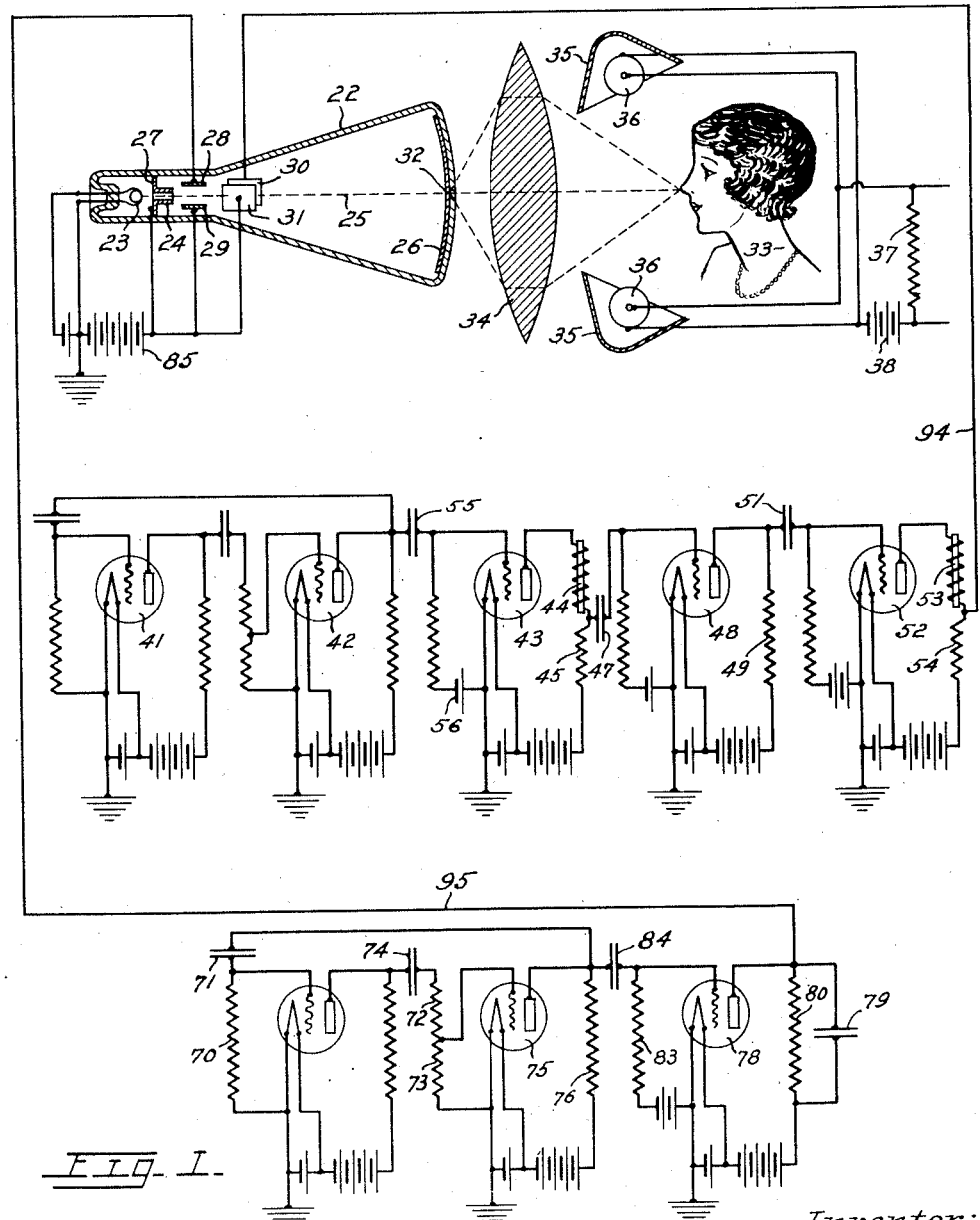
FIG. I.
Inventor;
Harry R. Lubcke,
per Arthur J. Farnsworth
Attorney.

April 6, 1937.   H. R. LUBCKE   2,075,818
TELEVISION APPARATUS
Filed March 30, 1931   3 Sheets-Sheet 2
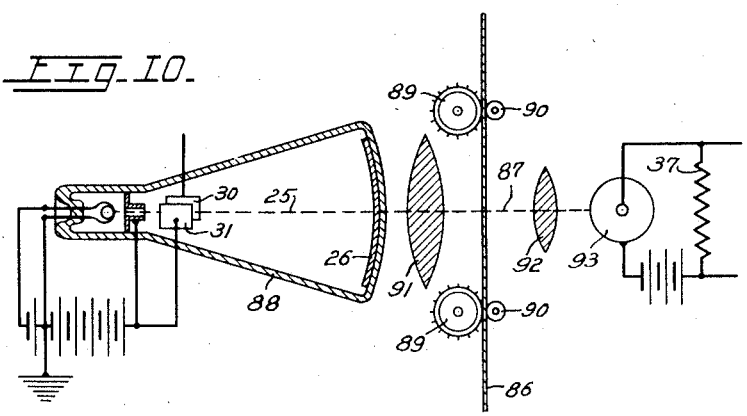
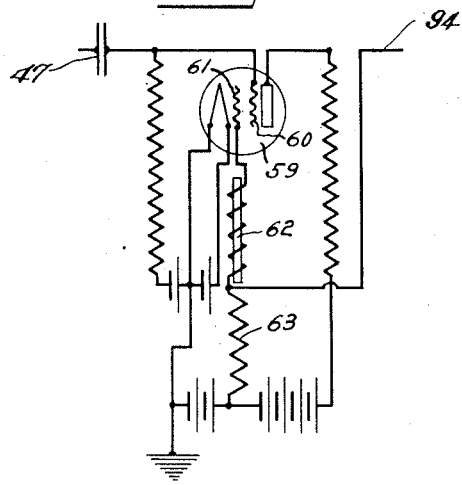
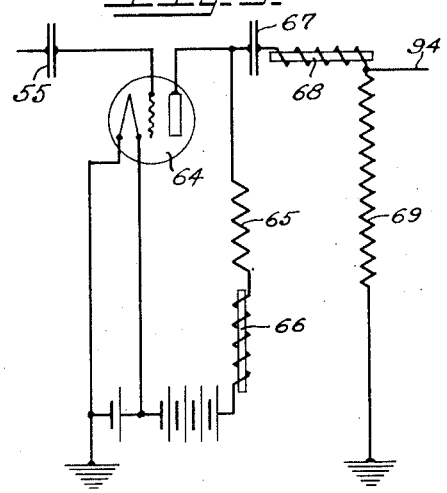
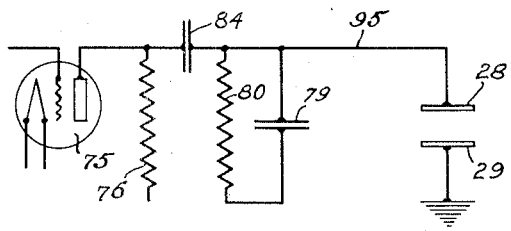
Inventor;
Harry R. Lubcke,
per Arthur J. Farnsworth
Attorney.

April 6, 1937.                    H. R. LUBCKE                    2,075,818
                                TELEVISION APPARATUS
                    Filed March 30, 1931        3 Sheets-Sheet 3
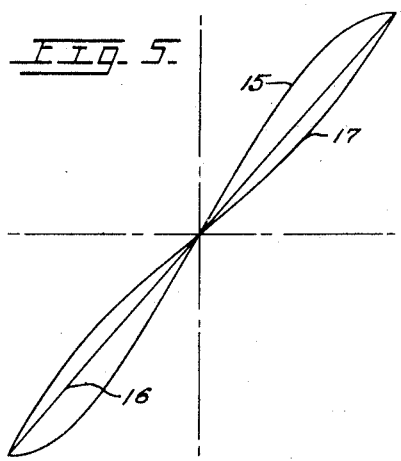
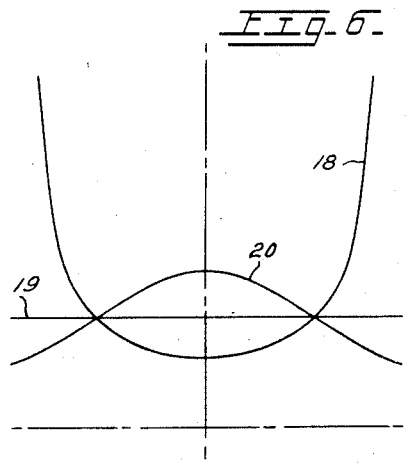
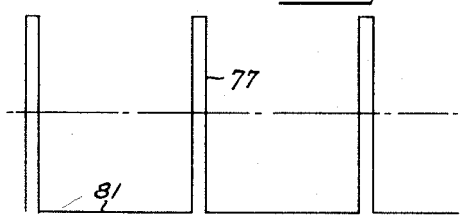
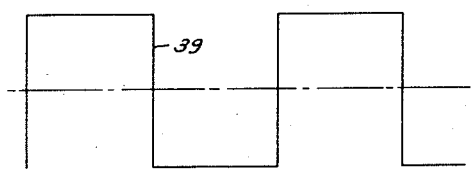
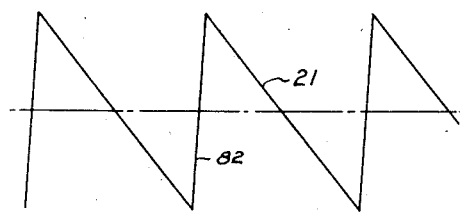
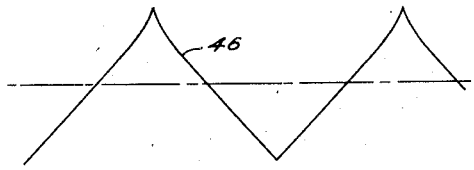
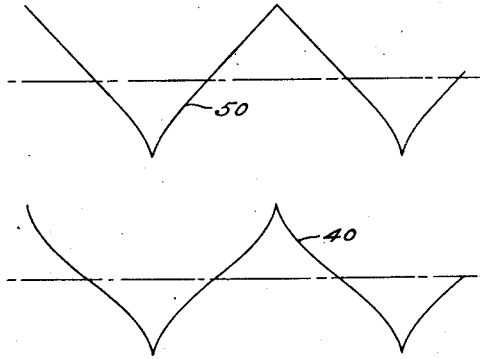
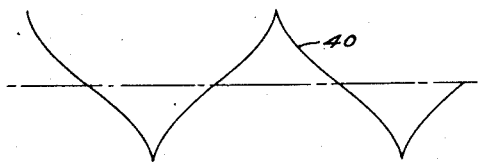
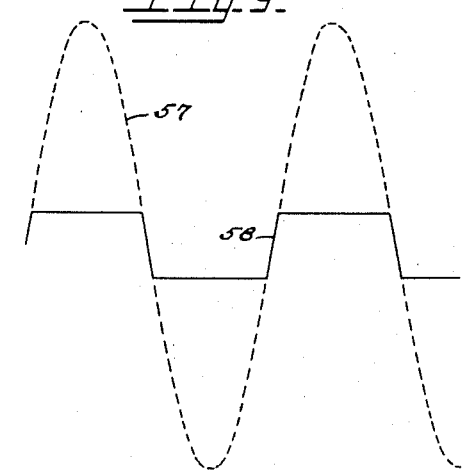
Inventor;
Harry R. Lubcke,
per Arthur J. Farnsworth
Attorney.

Patented Apr. 6, 1937

2,075,818

UNITED STATES PATENT OFFICE 2,075,818

TELEVISION APPARATUS

Harry R. Lubcke, Los Angeles, Calif.

Application March 30, 1931, Serial No. 526,282

5 Claims. (Cl. 178—6)

In this specification, and the accompanying drawings, I shall describe and show a preferred form of my invention, and specifically mention certain of its more important objects. I do not limit myself to the form disclosed, since various changes and adaptations may be made therein without departing from the essence of my invention as hereinafter claimed; and objects and advantages, other than those specifically mentioned, are included within its scope.

My invention relates to the art of television, and more specifically to means for television scanning. In this art it is often desirable to scan the subject by means of a rapidly moving spot of light, particularly in the case of a living subject. Mechanical means for accomplishing scanning by the use of a light spot are more or less unsatisfactory by reason of the exceedingly high scanning speeds that are required; and because of the resulting problems of inertia, centrifugal force, and others. Electrical means for directing and moving a spot of light for scanning purposes are much to be preferred, since none of the difficulties mentioned have to be overcome, and it is an object of this invention to provide improved electrical scanning means wherein a moving spot of light is employed.

Another object of the invention is to furnish facilities for causing a light spot to traverse the subject in a new and improved manner, that is better adapted for securing more satisfactory detail, and for obtaining better lighting effects in the transmitted picture than has been possible hitherto in the use of scanning beams.

A third object of the invention is to afford facilities for accomplishing television scanning by means of relatively simple and inexpensive apparatus that is light in weight and that requires small space, thus making it readily available and transportable. Other objects and advantages of my invention will appear in the following disclosure.

My objects have been attained in the manner illustrated in the accompanying drawings, in which:

Figure 1 is a diagrammatic disclosure of my complete invention including the apparatus therefor, and illustrates a preferred manner for connecting and co-relating its elements;

Figure 2 is a diagrammatic disclosure of how a quartrode (or four element vacuum tube) may be used in place of two of the triodes (three element tubes) that comprise the high frequency generator portion of the apparatus shown in Fig. 1;

Figure 3 shows diagrammatically another arrangement of apparatus for replacing a portion of the high frequency generator illustrated in Fig. 1, wherein both sides of the energy output wave may be peaked simultaneously;

Figure 4 is a diagram showing an alternative manner of arranging portions of the low frequency generator portion of the apparatus shown in Fig. 1;

Figure 5 illustrates three typical wave shapes that are available, and that may be employed for electrical scanning;

Figure 6 illustrates and affords means for comparing the distribution of detail in television images secured by the use of the scanning wave shapes shown in Fig. 5;

Figure 7 illustrates the wave shapes produced by the low frequency generators that are diagrammatically shown in Figs. 1 and 4;

Figure 8 shows diagrammatically how the high frequency generator of Fig. 1, and its alternative forms that embody the arrangements shown in Figs. 2 and 3, are capable of producing peaked wave forms of energy;

Figure 9 illustrates the operation of a peaked wave generator for modifying the energy of a sine wave oscillator; and Figure 10 shows a method of applying my invention to the scanning of a motion picture film for television purposes, and apparatus therefor.

I have employed standard or commonly used symbols in the figures, for representing various elements and wiring connections, for the sake of avoiding tedious and lengthy explanations. Such symbols and connections will be readily understood by these familiar with the art involved. Where the necessity for such elements and the connections between them is well understood, and corresponds to common practice, I have not thought it necessary to enter into detailed explanations herein. But where the elements are new, are used in a new manner, or where the illustrated circuits are capable of functioning in way that is novel to the art, I shall attempt, in what follows, to set forth a full and complete description thereof.

Certain of the elements shown in Figs. 1 and 10 are shown as being in central longitudinal section, more or less conventionalized and distorted for purposes of clarity.

Similar reference numerals refer to similar parts throughout the several figures.

In the case of television that is accomplished by radio methods, the frequency of the television signals is usually fixed between certain limits by statute, and it may also be so fixed by the limitations of the apparatus employed.

With this condition obtaining, when a traversing light spot is used for scanning, the fineness of detail that will appear in the received image will be inversely proportional to the instantaneous velocity of the scanning spot across the elementary areas of the subject. Since detail in the received image is very desirable, it follows that the velocity of the light spot should be as small as possible without sacrificing other essential requirements of the process. On the other hand, in order to take advantage of the well known effect of persistence of vision, and to avoid apparent flicker, the entire subject must be scanned approximately 15 times per second.

These matters must be taken into consideration, and they will have an effect upon the determination of both the scanning frequencies and the wave-shape of the energy that is used for moving and directing the scanning beam, since the instantaneous velocity of the scanning spot will be proportional at all times to the slope or derivative of the wave-shape of the directing energy employed. The instantaneous velocity need not be constant of course, and in practice it seldom is.

It is a matter of common knowledge that we are accustomed to expect the greatest amount of detail at the center of vision, and less detail toward the edges of our field of view. It is always the central portion of a picture on which vision is chiefly fixed, and the edges, although within our field of vision and noticeable, are always more or less hazy and lacking in detail. Therefore, if a picture or image is presented to the eye, in which detail at the edges is greater than in the central portions, it will have a peculiar and unnatural appearance. It is even true that where the detail is in fact uniform throughout all of the areas of a viewed picture or image, the detail at the edges thereof does not produce the same effect as the detail in the center, and therefore it is relatively unimportant. This matter of distribution of degree of detail, although obviously true when mentioned, has apparently escaped the attention of prior workers in the art of television; or, at least, the television apparatus that has hitherto been produced has not been adapted for securing the greatest amount of detail at the center of the television images, and it is therefore lacking in ability to secure the most satisfactory television results.

In the art of scanning by the use of an electrically directed spot of light, it is most convenient to cause the light spot to move back and forth across the subject in a zig-zag path, and to control and direct its movement by means of alternating current or potential. For these purposes it has been common practice hitherto to make use of electrical energy of substantially sine wave form, for directing and moving the light spot. This is probably for the reason that means for the production of sinusoidal electrical energy are particularly well known. It apparently has not been recognized that the use of energy of peaked wave form offers great advantages when zig-zag scanning with a light spot is employed. The present invention is largely concerned with the application of peaked wave forms of electrical energy to light spot scanning, and with apparatus therefor.

For the purpose of this discussion, I have illustrated in Fig. 5, three energy wave shapes that are available for light spot scanning, in half cycles positive and negative, all of them being of the same amplitude and frequency. In this figure curve 15 illustrates a sinusoidal wave shape, curve 16 represents a triangular wave shape, and curve 17 shows a wave shape of hyperbolic sine form. In this diagram the abscissae represent time intervals (t), and the ordinates represent instantaneous values of the directing energy (e) that controls the movement of the scanning beam. In the use of any such form of directing energy, it will be obvious that the velocity of the scanning spot at any instant will be the derivative of the curve, or $$\frac{de}{dt}$$

It will be noted that, in the use of sinusoidal energy represented by curve 15, the velocity of the scanning light spot is greatest at the center of its traverse (corresponding in position to the center of the television image that will result from the scanning), and that its velocity is zero at the ends of its path (where it changes its direction). In the use of energy having the triangular wave shape of curve 16, the velocity of the scanning beam will be constant throughout its traverse. It will change its direction of movement at the ends of its scanning paths, but not its absolute velocity. If energy of a hyperbolic sine wave is used, such as is indicated in curve 17, the velocity of the scanning light spot will be least at the center of its traverse, and greatest at the ends thereof where it also changes its direction.

In Fig. 6 I have illustrated the manner in which the character of the wave form of the energy that is used for directing the light spot will effect the detail of the television images secured thereby; it being assumed, as we did in the case of Fig. 5, that the frequency and amplitude of the alternating energy is the same in each case. We have already noted that the detail of the transmitted image will be inversely proportional to the velocity with which the scanning light spot traverses the elementary areas of the subject. If we use a sinusoidal wave form of directing energy, the velocity of the light spot will be greatest at the center of its traverse and we shall have the least amount of detail at this point of the resulting image. This variation of detail, when a sinusoidal wave form of directing energy is used, is shown by curve 18 of Fig. 6. It will be noted that this curve is asymptotic, and that the detail is least at the center, and enormously increased at the edges of the image. This is exactly the reverse of what we desire. When a triangular wave form is used for the directing energy, the velocity of the light spot is uniform, and so is the amount of detail throughout the television image. This is shown by curve 19 of Fig. 6. When the directing energy is of hyperbolic sine wave form, the detail of the resulting television image will be greatest at the center, and least at the edges, as shown in curve 20 of Fig. 6. It is thus obvious that the use of a hyperbolic sine wave form of energy will give us much more satisfactory results in the transmitted image than the use of either of the other two forms of wave energy illustrated.

From the foregoing discussion it will be seen that, in a general way, directing energy that has a peaked wave form, i. e., one in which the sides of the wave lobes are concave, is much to be preferred in the art we are discussing, to energy in which the sides of the wave lobes are convex. We are not necessarily limited to the use of truly hyperbolic sine waves for securing the best results, but we do desire to use a peaked wave shape, of which the hyperbolic sine wave is a mathematically convenient prototype. It is to be understood that the peaks of a hyperbolic, or any other form of peaked wave, cannot be infinitely sharp in any practical apparatus, but that, to all intents and purposes, the objects outlined above are attained with the practical peaked wave.

In the preceeding discussion, we have been considering electrical means for moving the scanning light spot back and forth across the subject. In order to accomplish this in a zig-zag manner, there must be concurrent means for moving the light spot in a direction perpendicular to that we have been considering, and at a much lower frequency. Assuming that we have discussed hitherto only means for moving the spot horizontally across the subject, we must supply somewhat similar means for moving the spot vertically, at a small fraction of the frequency that is used for the horizontal scanning. The same considerations of detail in the transmitted image will apply to the selection of the methods for moving the spot vertically at a lower frequency, and a peaked wave form of energy can be used for this purpose in order to secure the maximum of detail at the center of transmitted image. There are, however, two ways in which the vertical movements may be accomplished. The scanning spot may be caused to move in a zig-zag course from the top of the subject to the bottom and then from the bottom of the subject to the top, and repeat; or, the spot may be caused to move in a zig-zag path from the top of the subject to the bottom, and then jump to the top of the subject and repeat. In either of these cases, it is desirable to use a peaked wave form of energy for moving the light spot vertically over the subject during the time it is zig-zagging; but when the spot is jumped from the bottom to the top of the subject for repetition, the energy wave may be of saw-tooth form, such as that indicated by the curve 21 of Fig. 7.

Passing now to a description of the apparatus that I employ for accomplishing electrical scanning by the use of peaked energy waves, I have illustrated diagrammatically in Fig. 1 preferred apparatus for this purpose, and the manner in which it may be connected and co-related. In this figure I have shown at 22 the glass envelope of an electron discharging device that is of the nature of a Braun tube. This comprises an electron emitting cathode 23, and a tubular anode 24 which coacts to produce a beam of electrons which normally pass down the axis 25 of envelope 22. This electronic beam impinges upon a fluorescent screen 26, that is located within the envelope near or upon an enlarged end thereof. The impingement of the electronic beam upon the fluorescent screen produces a bright spot of light thereon, of a diameter proportional to the size of tubular anode 24. A metallic shield 27, at the entrance of the tubular anode, effectually prevents emission of electrons except such as pass through it.

The electronic beam which has emerged from tubular anode 24 may easily be deflected by electrostatic or electromagnetic means, as is well understood. In the figure I have illustrated a pair of spaced plates 28 and 29, above and below the axis of the tube respectively and slightly to the right of anode 24. When this pair of plates is subjected to alternating potential, they will deflect the electronic beam up and down in a vertical plane. At 30 and 31 I have shown a similar pair of spaced plates behind and in front of the axis of the tube respectively. These latter plates are at the same elevation, but the figure shows them perspectively for greater clearness. Thus if the diagram was considered as merely an elevation, plate 30 would not be seen, since it is directly behind plate 31. When these latter two plates are subjected to an alternating potential they will deflect the electronic beam horizontally back and forth across fluorescent screen 26. If both pairs of plates are subjected to alternating potential simultaneously, each pair will exert its effect, and the electronic beam will be caused to vibrate across the fluorescent screen in a slanting path. If the frequency of the alternating potential by which plates 30 and 31 are excited is many times the frequency with which plates 28 and 29 are excited, and a saw-tooth form of energy is used for plates 28 and 29, the electronic beam will be caused to move in a zig-zag path from the top of fluorescent screen 26 to the bottom thereof, and repeat. If now we vary the type of excitation of plates 28 and 29 from the saw-tooth wave form of excitation to the peaked wave form shown at 40 in Fig. 8, the electronic beam will move in a zig-zag manner from the top of fluorescent screen 26 to the bottom thereof, and then from the bottom to the top and repeat.

In view of the above, it will be seen that, by the choice of suitable wave shapes and suitable ratios of frequencies for exciting the respective pairs of deflecting plates 28—29 and 30—31, the electronic beam may be caused to traverse fluorescent screen 26 in practically any manner we desire, and so as to cover the entire area within a substantially rectangular frame thereof. We can easily apply the principles we have previously discussed, to the apparatus of Fig. 1 to secure the particular velocity of the scanning beam we desire, at every portion of the scanned area of fluorescent screen 26.

In passing it is well to note that electro-magnetic devices can be substituted for plates 28—29 and 30—31 if desired, and be caused to produce practically the same results as those just described.

The electronic beam, by its impingement upon screen 26 will produce a bright spot of light thereon, as at 32. This spot will be visible through the glass end at the right hand extremity of tube 22. An image of this light spot is focused upon the subject 33 that is to be scanned, by means of a lens 34 of relatively large aperture and short focal length. The distance between the fluorescent screen and the lens determines not only the distance from the lens at which the light spot will be brought to a focus, but also the distance that the focused spot may be diverted from the prolonged axis 25, as the result of the action of the diverting plates. By placing the lens relatively close to screen 26, the light spot on the subject may be moved across a relatively large field, thus making it possible to scan a group of persons. By placing the lens further away from the fluorescent screen, a small subject may be very minutely scanned. It will be understood that, in order to secure the best results, the subject should not be illuminated, or be only slightly illuminated, by sources other than the scanning light spot.

The light reflected from the subject by reason of the illumination caused by the scanning spot, is intercepted by reflectors 35 and focused upon very sensitive and rapid photo-electric devices 36. The light reflected from the subject will vary from instant to instant, according to the reflecting capacity of the particular elementary area of the subject that is being scanned at the instant. Therefore, if the photo-electric devices are connected in multiple to a circuit that includes a resistor 37 and battery 38, the voltage between the terminals of this resistor will vary from instant to instant, in proportion to the amount of light that is reflected from the subject at that moment. These voltage variations across resistor 37 may be amplified in any usual and suitable manner to constitute television signals, whereby an image of the subject can be reproduced at a distant point if the receiving apparatus is properly tuned and synchronized with the transmitting apparatus described.

Fig. 1 also illustrates how plates 30 and 31 may be excited by means of a peaked wave generator, the latter being indicated diagrammatically in the central portion of the figure. In the arrangement shown, the generator comprises a device that first produces a potential of rectangular wave form, such as is indicated by curve 39 of Fig. 8; and also includes non-linear amplifying devices which have such characteristics as to enable them to alter this wave shape to the form shown in curve 40 of Fig. 8. This generating device will now be considered in detail.

The generator just mentioned includes a pair of triodes 41 and 42, constituting a device known as a multi-vibrator, described by Abraham and Bloch in 12 Ann de Phys 237, in 1919. This device produces substantially the rectangular voltage wave form 39 of Fig. 8. This wave form is applied to the grid of triode 43, and results in an amplified voltage wave form of rectangular shape appearing at the plate or anode of this triode. Element 44 is an iron-cored inductance of large value, so constituted as to saturate upon the application of the instantaneous maximum currents that pass through it. An inductance of a relatively large number of turns of wire, and having a small cross section of iron core without air gap, will meet this requirement. Resistor 45 is in series with said inductance, and is made relatively small, so that the combination of elements 44 and 45 comprises a circuit of large time constant, of a value two or three times as large as the period of one-half cycle of the alternating current supplied by the multi-vibrator.

When the amplified rectangular voltage wave from triode 43 is applied across the terminals of elements 44 and 45 in series, an approximately triangular wave shape of current will flow, because of the time required to build up this current in this highly inductive circuit. This current will build up initially according to the well known exponential law that applies when a constant E. M. F. is applied to an inductance. As this current increases to higher values, the effect or saturation will become evident, and the current will build up more rapidly than according to the exponential law. This condition will continue until the rectangular voltage wave reverses. The current will then decrease rapidly at first, because of the saturated condition of the inductance, and then more slowly when the lower value of the current removes the saturation effect. For these reasons the current flowing in circuits 44 and 45 will have a wave form substantially as illustrated in curve 46 of Fig. 8. The voltage drop in resistor 45 will be of exactly the same shape and the same phase as this current.

The voltage drop across resistor 45 is applied, with condenser 47 in series, to the next triode 48. The latter is a linear amplifier, and the arrangement reverses the phase of the voltage 180 degrees. The output of this triode 48, appearing across resistor 49, is shown as the curve 50 of Fig. 8. This is applied, through condenser 51 in series, to the grid of the final triode 52. The voltage wave is amplified in the latter triode, and the output current is caused to flow through inductance 53, and resistor 54. It is peaked at the maximum points in the manner described, and thus the final voltage wave appearing across resistor 54 takes the form of curve 40 of Fig. 8. This final output of the generator is applied to deflection plates 30 and 31 as indicated in the diagram, one side of resistor 54, and also one of the deflection plates being connected to ground, as shown.

In the generator just described, the first two triodes, viz. 41 and 42, can be of small output; and the triodes 43, 48 and 52 can be made of successively larger capacity, so that each will handle properly the amplified output of the preceding triode. In such an arrangement, inductance 53 will be constituted to saturate at a higher current value than that at which inductance 44 saturates.

Another form of peaked wave generator that may be used, makes use of a sine wave oscillator of any type, such as the Heising or Colpitts oscillators, instead of the multi-vibrator device indicated by reference numerals 41 and 42. In such a case the multi-vibrator elements shown are removed, and the output of the sine wave oscillator is connected to condenser 55 and to the ground. Battery 56 is also removed in this case, and replaced by a conductor, so that the normal grid voltage of triode 43 will be that of its filament. The sine wave voltage applied to the grid of triode 43 in this arrangement is made many times greater than the grid voltage range from cut-off to saturation values of the plate current. Hence, during practically all of each half cycle, the grid voltage will be such that the plate current would be at either its saturation value or zero. Assuming for the moment that inductance 44 is omitted from the plate circuit, the in-put voltage wave applied to the grid of triode 43 is represented by the dotted sinusoidal curve 57 of Fig. 9; and the plate current wave of triode 43 (if inductance 44 is omitted) is shown as the curve 58 of Fig. 9. The nearly vertical sides of the large amplitude sine wave near its axis, make the commutation from saturation to cut-off very rapid. If inductance 44 is now placed in the circuit, the current from the plate of triode 43 will be peaked, as though a square wave input was used, in the manner described before, the result being as shown in curve 46 of Fig. 8. The rest of the peaking process in this alternative form of generator is accomplished in the manner described above.

In either form of peaked wave generator, the functions of the triodes 52 and 48 can be performed by one quartrode illustrated at 59 in Fig. 2. In the arrangement shown in the latter figure, the elements of triode 52 are retained intact, but the condenser 47 is not connected to the grid corresponding to that of the original triode, but instead it is connected to the outer grid 60 of the quartrode, shown as being of the "space-charge" type. In this device, therefore, the current to the inner grid 61 is 180 degrees out of phase with the voltage of grid 60, instead of in phase with it, as it is in the case of the plate of the quartrode or corresponding triode. This makes the phase reversing triode 48 unnecessary, the current to grid 61 having the shape of curve 50 of Fig. 8. The saturating inductance 62 and the resistor 63, in the inner grid circuit, perform the same functions as elements 53 and 54 of Fig. 1.

Still another alternate arrangement of the generator permits of omitting triodes 48 and 52, by substituting another triode and inductances in such a manner that direct current cannot flow through the inductance. Such an arrangement is indicated in Fig. 3, wherein a conductive path for the direct current of triode 64 is provided by resistor 65 and inductance 66. In this case the resistor and inductance are shunted to ground through condenser 67, inductance 68, and resistor 69. Inductance 66 does not saturate with the current that passes through it in this case, and its value is several times that of the peaking inductance 68, to the end that very nearly all the alternating component of the plate current of triode 64 flows through condenser 67, inductance 68, and resistor 69. Inductance 68 is so constituted that it saturates on the maximum of the current wave, and, since no direct current component is present, each maximum of the wave will be peaked, thus permitting this single inductance 68 to function to produce a wave form shown at 40 of Fig. 8.

A suitable low frequency generator, for exciting deflecting plates 28 and 29 is indicated diagrammatically in the lower portion of Fig. 1. This comprises a multi-vibrator arranged to give a rectangular wave shape in which the alternate half cycles are of widely different periods; and an amplifying triode in the plate circuit of which is located a condenser-resistor combination of large time constant.

In this multi-vibrator, the period of one-half cycle is determined by the time constant of resistor 70 and condenser 71; and the period of the other half cycle by the time constant of resistors 72 and 73, in series with each other and with condenser 74. The ratio of these two time constants is made large, say ten to one. The output of this multi-vibrator appears across resistor 76, in the form of the curve shown at 77—81 in Fig. 7. This wave form is impressed upon the grid of triode 78. The time constant of the condenser-resistor combination 79 and 80 is made two or three times as great as the long period of the multi-vibrator indicated at 81 in Fig. 7. The narrow peaks of voltage indicated at 77 of Fig. 7, occasioned by the short periods of the multi-vibrator, rapidly charge the condenser 79; and during the long periods 81, this condenser discharges through resistor 80. This results in modifying the rectangular wave shape shown in curve 77—81, to that shown in curve 21—82 of Fig. 7. The condenser 79 discharges according to the well known exponential law, but since the time constant of the combination is several times longer than the time allowed for discharge (which time is determined by the long multi-vibrator period), only the first portion of the discharge occurs, and this is very closely linear.

Figure 4 shows an alternate arrangement of generator for exciting deflecting plates 28 and 29, wherein triode 78 and resistor 83 are omitted, and wherein the resistor-condenser combination 79 and 80 is connected directly to a condenser 84.

In this case the rectangular wave form of curve 77—81 of Fig. 7 is directly impressed upon resistor 80 and condenser 79; and this arrangement gives the saw-tooth wave form of energy shown in curve 21—82 as before.

Another useful form of peaked wave may be produced by the combined utilization of the multivibrator source of the low frequency generator, diagrammatically indicated in the lower portion of Fig. 1; and the peaking elements of the peaked wave generator, similarly shown in the central portion of that figure. The frequency of the source may be raised so that it can properly coact with the peaking elements; or the latter may be adjusted so as to operate at the low frequency of the source. Either of these two devices is adapted to operate at any desired frequency, by the use of suitably chosen constants, as is well known in the art.

In the manner just described, a rectangular waveform, of the kind shown in the upper curve of Fig. 7, may be impressed upon the peaking elements. This will result in a waveform similar to the lower curve of Fig. 7, except that the wave will be peaked on both the long and short period swings. It will be somewhat similar to that shown in curve 40 of Fig. 8, but it is to be distinguished from that waveform in that the latter is of equal periods for the swings in opposite directions, and is produced when a rectangular waveform of the kind shown at 39, is impressed upon the peaking circuit.

It is to be noted that in both of the generators shown in Fig. 1, no filter is employed to remove the direct potential existing in the output by virtue of the conducting coupling to the plate batteries of the respective out-put tubes. The voltage of these batteries is made equal to that of anode battery 85 of cathode-ray tube 22. With this arrangement the deflecting plates 28 and 29 are always at the proper potential, and a worthwhile simplification is thus effected.

In Fig. 10 I have illustrated diagrammatically, means for the teletransmission of motion pictures by my improved method. A motion picture film 86 is made to pass transversely across the light beam 87 from tube 88, the latter being a slightly modified form of tube 22 previously discussed. The film is moved at a uniform velocity, instead of intermittently, by means of sprockets 89 and guide rollers 90. In this manner the movement of the film itself provides one of the motion components required for scanning. Deflection plates 28 and 29, and the generator required for energizing them, are not required. The electron beam 25 is deflected back and forth across fluorescent screen 26 by plates 30 and 31 in the manner already described, and these may be energized in the way disclosed supra. The combined motions of the film and light beam will result in a zig-zag scanning of the film. A lens 91 is used to focus the luminescent light spot of screen 26 upon the film; and the diverging rays that leave the film are collected by lens 92 and focused upon the photo-electric device 93. The variation of current in the photo-electric device will result in television signal pulses across resistor 37, as explained above.

In the arrangement shown in Fig. 10 the film may be considerably spaced from the scanning tube. If it is desired, lens 91 may be omitted, and the film be positioned close to the end of the scanning tube, or even be dragged across it.

For the purpose of identification, and to enable it to be more clearly seen how the mentioned substitution of generator arrangements may be made; I have, in each of the figures involved, designated the conductor leading to deflector plate 30 by the numeral 94. Similarly I have designated the conductor leading to deflector plate 28 by the numeral 95.

The resistors, batteries, condensers, grounds, and conductors not specifically mentioned herein, will be recognized by the conventional symbols used to illustrate them. The necessity or desirability of employing such elements at the positions shown, and with the connections designated, will be either apparent or readily understood by those familiar with the art involved.

Having thus fully described and illustrated my invention, I claim:

1. In television apparatus; a source of electrical energy of substantially rectangular wave shape; a triode connected to said source having an inductance and resistance in series in its plate circuit, said inductance being so proportioned as to saturate during the period of the peaks of the current that passes therethrough; a second triode connected to said inductance and adapted to act as a linear amplifier of said current; and a third triode connected to said second triode and having an inductance and resistance in series in its plate circuit, said second inductance being so proportioned as to saturate during the period of the peaks of the current that passes therethrough.

2. Television apparatus comprising; a single source of alternating electrical energy, adapted to produce waves of approximately rectangular shape; a thermionic device connected to the output of said source; and a capacitance, an inductance, and a resistance connected in series to the output of said device; said series being adapted to reshape said energy to a waveshape having alternately peaked apexes and gradually curved concave sides adjacent said apexes, by virtue of said inductance becoming saturated at the time of formation of the peaks of the last said waveshape.

3. Television apparatus comprising; a single source of electrical energy of substantially sinusoidal waveshape; a thermionic device connected to the output of said source; and a capacitance, an inductance, and a resistance connected in series to the output electrode of said device; said series being adapted to reshape said energy to a peaked waveshape having alternately peaked apexes and gradually curved concave sides adjacent said apexes, by virtue of said inductance becoming saturated at the time of formation of the peaks of the last said waveshape.

4. Television apparatus comprising; a single source of alternating electrical energy, adapted to produce waves of approximately rectangular shape; a thermionic device connected to the output of said source, and having an inductance and resistance in series in its plate circuit, said inductance being so proportioned as to saturate during the period of the peaks of said current; a second thermionic device having a cathode, an input electrode, a plate, and an auxiliary electrode; the output of the first thermionic device being connected to the input electrode of the second thermionic device; said auxiliary electrode being positioned between said cathode and said input electrode in the structure of the second thermionic device, whereby the current flowing to said auxiliary electrode will be of opposite phase to the voltage at the last said input electrode; and an inductance and resistance in series in the circuit of said auxiliary electrode; said second inductance being so proportioned as to saturate during the period of the peaks of the current that passes therethrough.

5. In television apparatus; a multivibrator oscillator adapted for producing alternating electrical voltage waves of substantially rectangular wave shape; a high vacuum thermionic device; a condenser connected to the output circuit of said oscillator, and to the input circuit of said thermionic device; a resistance directly connecting the input electrode and the cathode of said thermionic device, thereby permitting a constant component of anode current to flow through said device; and a second resistance and second condenser, connected in parallel to each other and to the anode of said thermionic device; said second resistance and second condenser having a large time constant with respect to the period of the energy flowing therethrough, whereby the potential of the anode of said thermionic device may be made to vary with respect to time according to a saw-tooth waveshape having substantially rectilinear slopes.

HARRY R. LUBCKE.